United States Patent
Shapiro

(10) Patent No.: US 7,856,451 B2
(45) Date of Patent: Dec. 21, 2010

(54) SELECTIVE FILE ERASURE USING METADATA MODIFICATIONS

(76) Inventor: Alan Joshua Shapiro, 1256 Hardscrabble Rd., Chappaqua, NY (US) 10514

( * ) Notice: Subject to any disclaimer, the term of this patent is extended or adjusted under 35 U.S.C. 154(b) by 0 days.

(21) Appl. No.: 12/534,839

(22) Filed: Aug. 3, 2009

(65) Prior Publication Data

US 2009/0292747 A1 Nov. 26, 2009

Related U.S. Application Data

(62) Division of application No. 11/611,886, filed on Dec. 17, 2006, now Pat. No. 7,571,176.

(60) Provisional application No. 60/753,635, filed on Dec. 22, 2005, provisional application No. 60/747,201, filed on May 14, 2006.

(51) Int. Cl.
*G06F 17/30* (2006.01)
(52) U.S. Cl. ................ 707/791; 707/802; 707/822; 707/828
(58) Field of Classification Search .......... 707/600–831
See application file for complete search history.

(56) References Cited

U.S. PATENT DOCUMENTS

| | | | |
|---|---|---|---|
| 4,481,606 A | 11/1984 | Nozawa et al. | |
| 5,196,970 A | 3/1993 | Seko et al. | |
| 6,247,024 B1 | 6/2001 | Kincaid | |
| 6,247,128 B1 | 6/2001 | Fisher et al. | |
| 6,512,526 B1 | 1/2003 | McGlothlin et al. | |
| 6,543,047 B1 | 4/2003 | Vrhel, Jr. et al. | |
| 6,681,391 B1 | 1/2004 | Marino et al. | |
| 6,757,783 B2 | 6/2004 | Koh | |
| 6,760,721 B1 | 7/2004 | Chasen et al. | |
| 6,807,665 B2 | 10/2004 | Evans et al. | |
| 6,823,376 B1 | 11/2004 | George et al. | |
| 6,868,496 B2 | 3/2005 | Sales et al. | |
| 6,874,092 B1 | 3/2005 | Motoyama et al. | |
| 6,874,143 B1 | 3/2005 | Murray et al. | |
| 6,915,307 B1 | 7/2005 | Mattis et al. | |
| 6,993,642 B2 | 1/2006 | Burkhardt et al. | |
| 7,092,949 B2 | 8/2006 | Ohgake | |
| 7,143,067 B1 | 11/2006 | Cheston et al. | |
| 7,330,967 B1 | 2/2008 | Pujare et al. | |
| 2003/0037326 A1 | 2/2003 | Burkhardt et al. | |
| 2003/0046372 A1 | 3/2003 | Traxler | |
| 2003/0046493 A1 | 3/2003 | Coulson | |
| 2003/0154206 A1 | 8/2003 | Kanai | |
| 2003/0158926 A1 | 8/2003 | Kroening | |

(Continued)

FOREIGN PATENT DOCUMENTS

EP 1 688 922 A2 8/2006

(Continued)

*Primary Examiner*—Isaac M Woo
(74) *Attorney, Agent, or Firm*—Charles A. Lemaire; Jonathan M. Rixen; Lemaire patent Law Firm, P.L.L.C.

(57) ABSTRACT

A process that ensures the virtual destruction of data files a user wishes to erase from a storage medium, such as a hard drive, flash drive, or removable disk. This approach is appropriate for managing custom distributions from a large file sets as it is roughly linear in compute complexity to the number of files erased but is capped when many files are batch erased.

25 Claims, 11 Drawing Sheets

Areas of UDF file and directory affected by selective erasure methods. Note that this figure does not include the "free extent" file, which is modified the same way in both the original and invented methods.

Erasing a single file in UDF. This flowchart does not include all actions taken by the "standard" delete that the new method does as well.

U.S. PATENT DOCUMENTS

| | | |
|---|---|---|
| 2003/0193994 A1* | 10/2003 | Stickler ............. 375/150 |
| 2004/0015536 A1 | 1/2004 | Cohen et al. |
| 2005/0055688 A1 | 3/2005 | Barajas et al. |
| 2005/0125524 A1 | 6/2005 | Chandrasekhar et al. |
| 2005/0132126 A1 | 6/2005 | Lin et al. |
| 2005/0222916 A1 | 10/2005 | Ohbitsu |
| 2006/0053419 A1 | 3/2006 | Barfield et al. |
| 2006/0200656 A1 | 9/2006 | Cardinell et al. |
| 2006/0224818 A1 | 10/2006 | Stewart |
| 2006/0224902 A1 | 10/2006 | Bolt |
| 2006/0259587 A1 | 11/2006 | Ackerman et al. |
| 2006/0265706 A1 | 11/2006 | Isaacson et al. |
| 2006/0277183 A1 | 12/2006 | Nichols et al. |
| 2007/0005874 A1 | 1/2007 | Dodge |
| 2007/0028231 A1 | 2/2007 | Kelso et al. |

FOREIGN PATENT DOCUMENTS

JP 2003-323371 11/2003

* cited by examiner

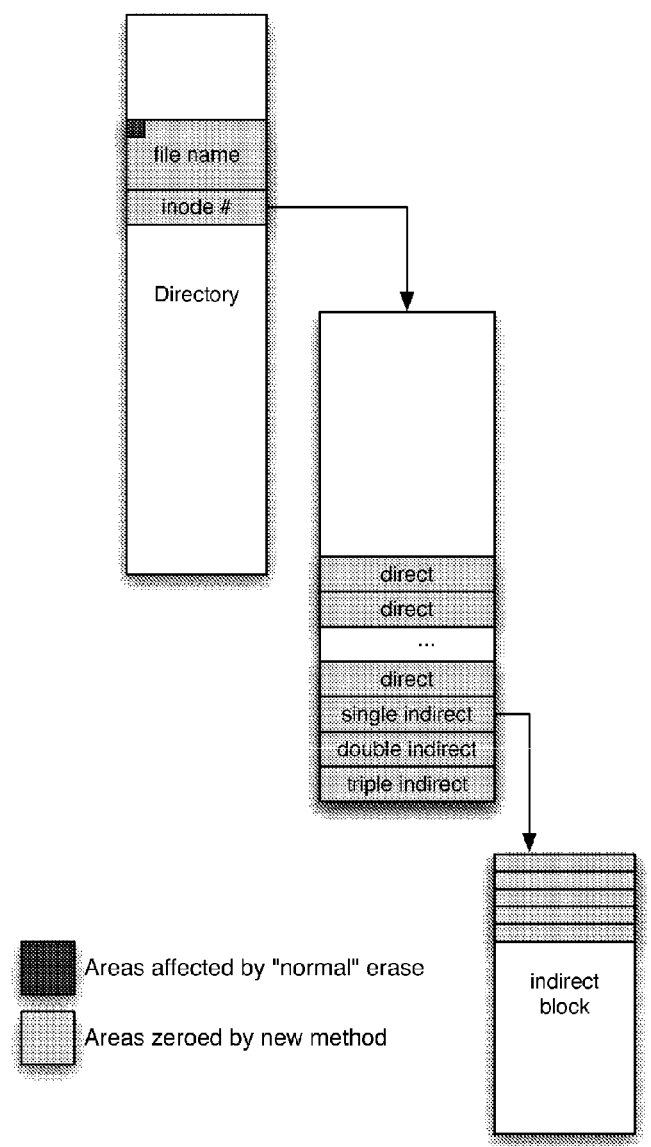
Figure 1A: Areas of ext2 file affected by selective erasure methods

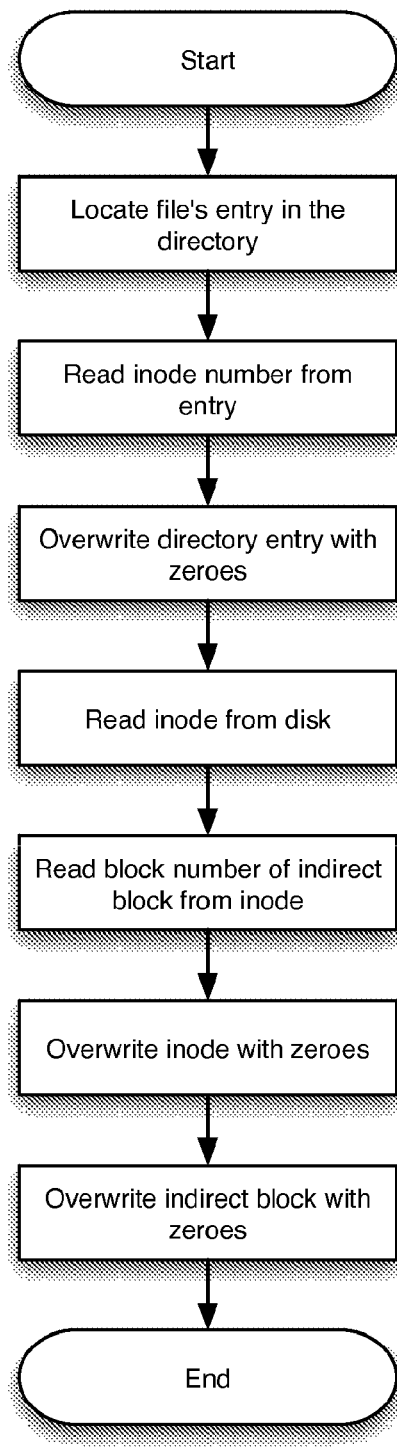
Figure 1B: Erasing a single file in ext2

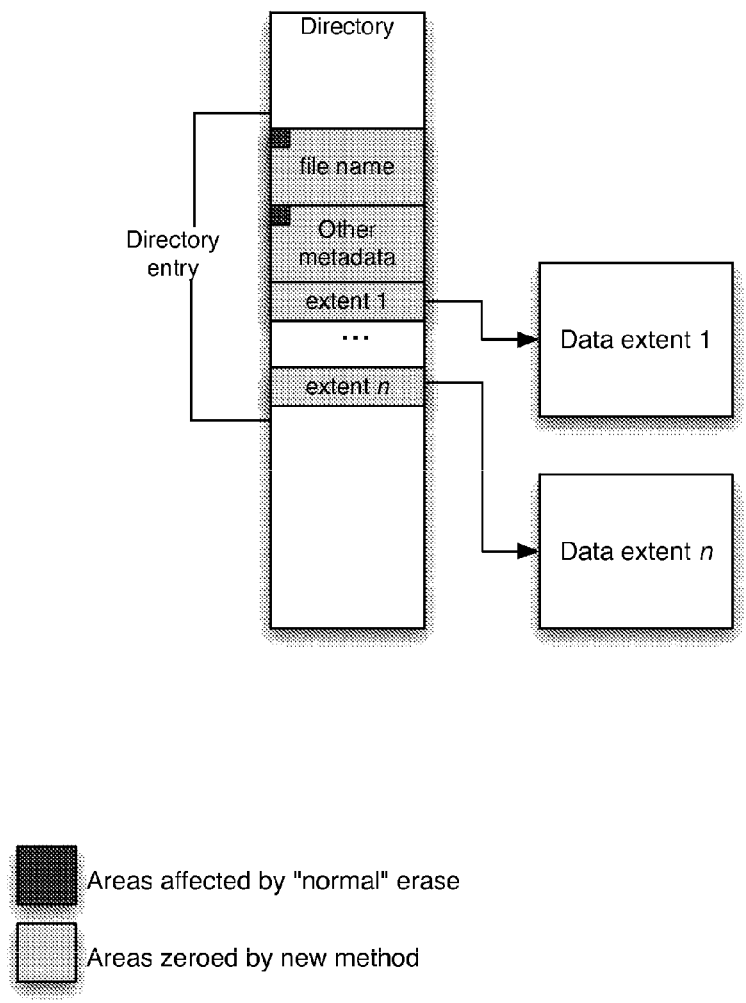
Figure 2A: Areas of UDF file and directory affected by selective erasure methods. Note that this figure does not include the "free extent" file, which is modified the same way in both the original and invented methods.

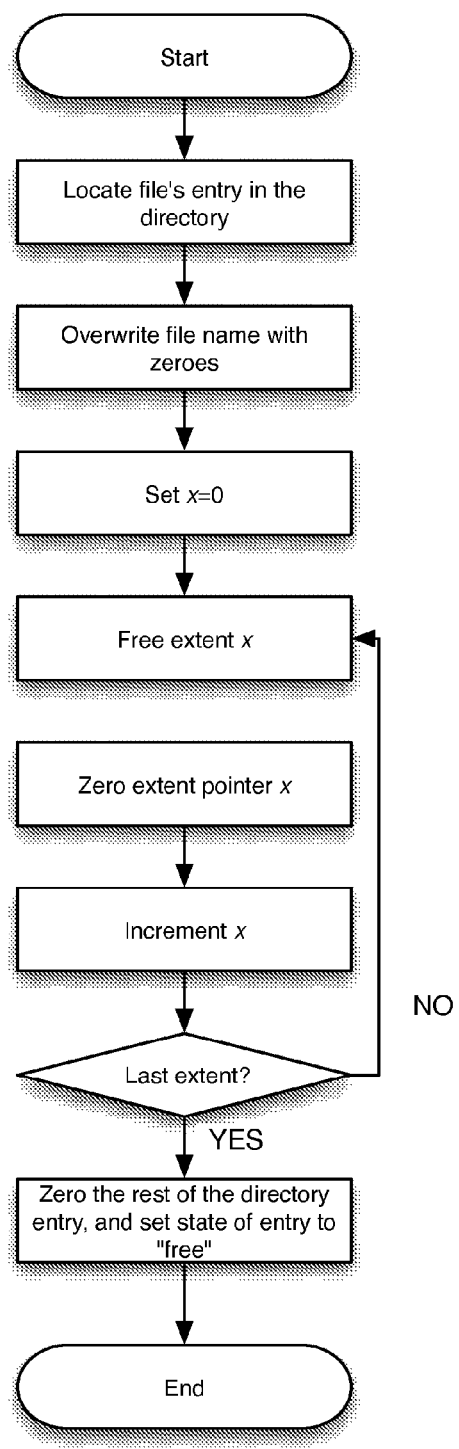
Figure 2B: Erasing a single file in UDF. This flowchart does not include all actions taken by the "standard" delete that the new method does as well.

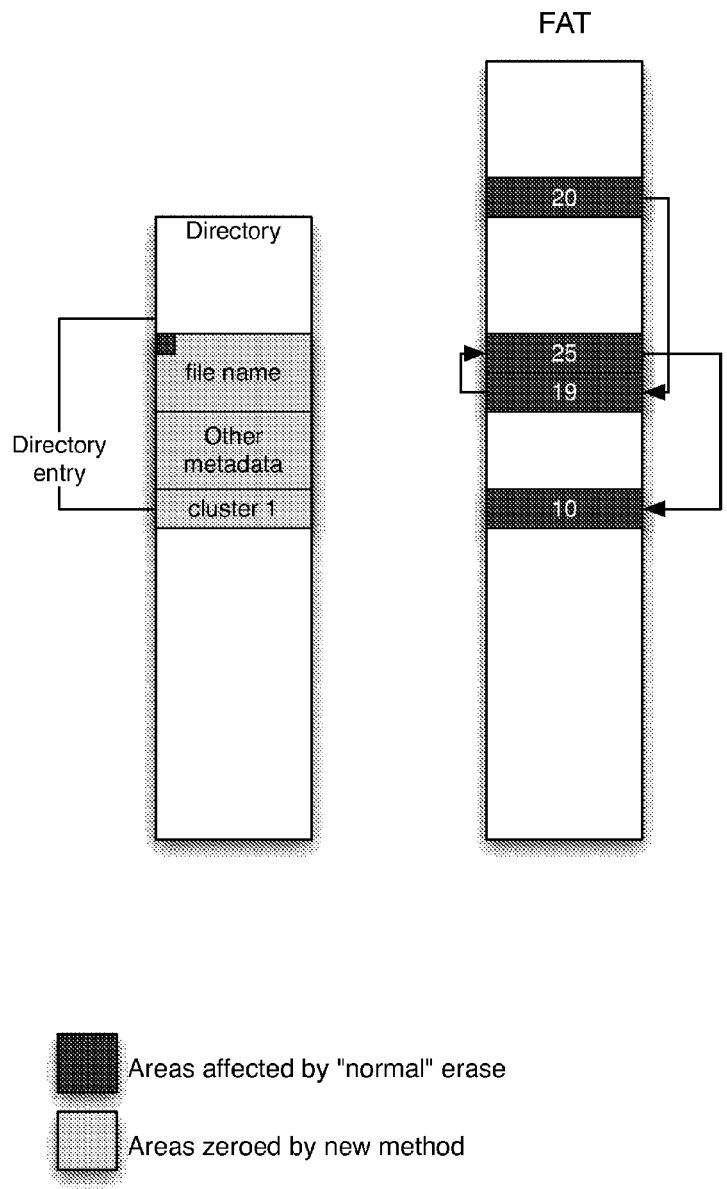
Figure 3A: Areas of FAT32 file and directory structures affected by selective erasure methods. Default behavior zeroes the entries in the FAT, but not the directory, except for the first byte of the file name.

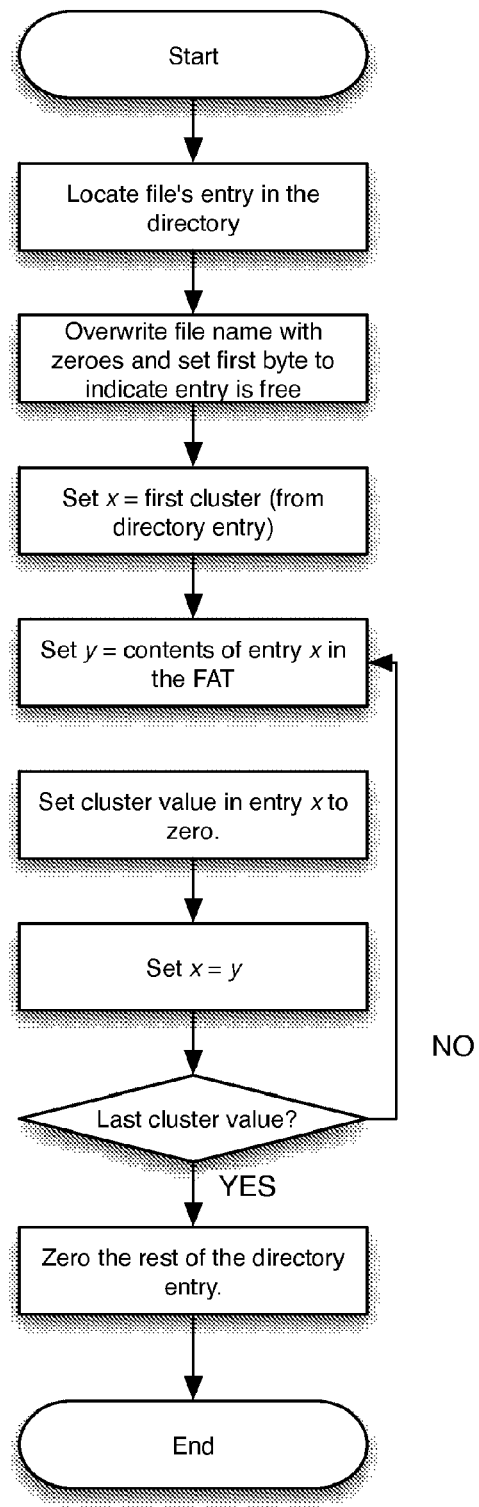
Figure 3B: Erasing a single file in FAST32. This flowchart does not include all actions taken by the "standard" delete that the new method does as well.

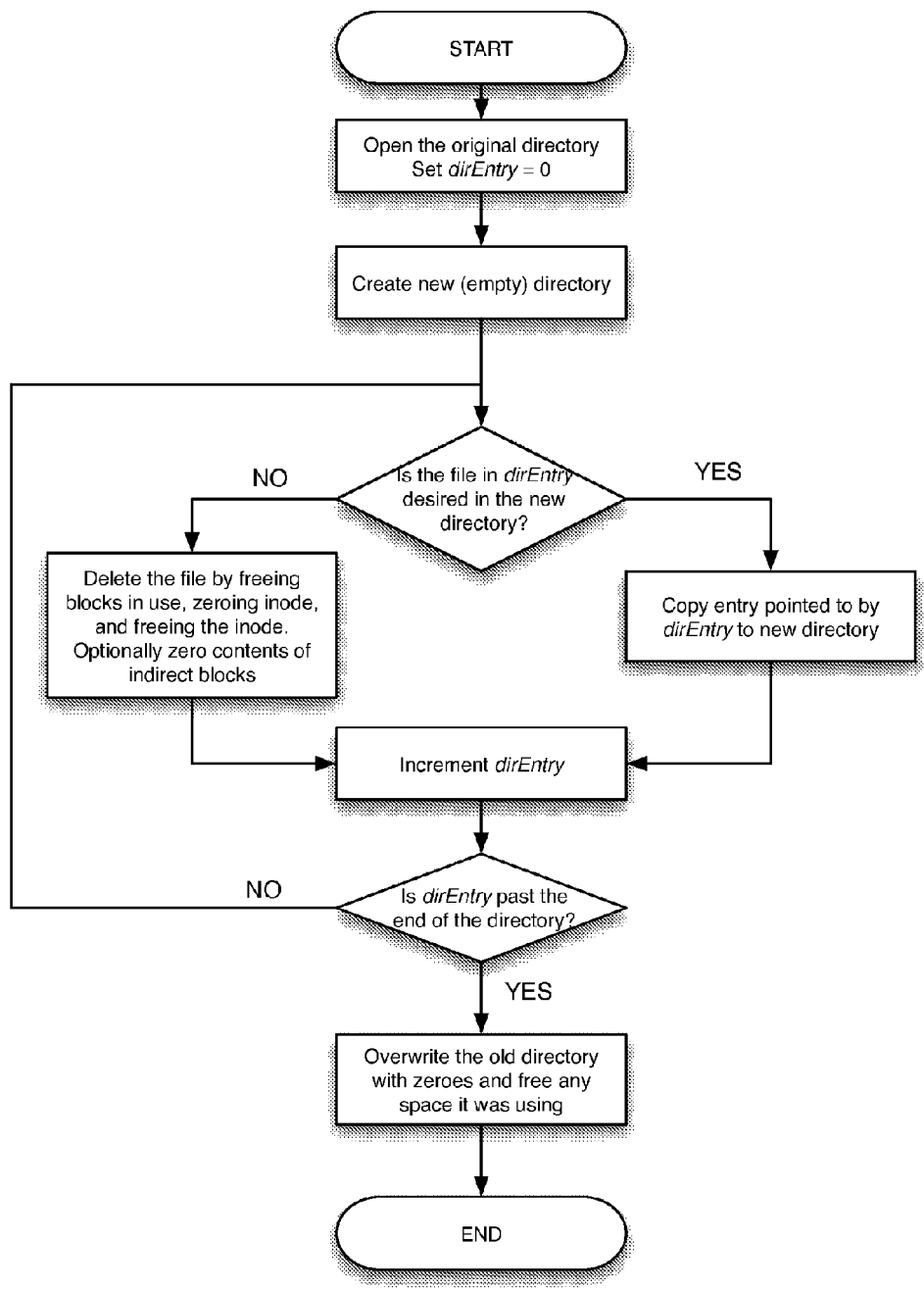
Figure 4: Deleting many files from an ext2 directory.

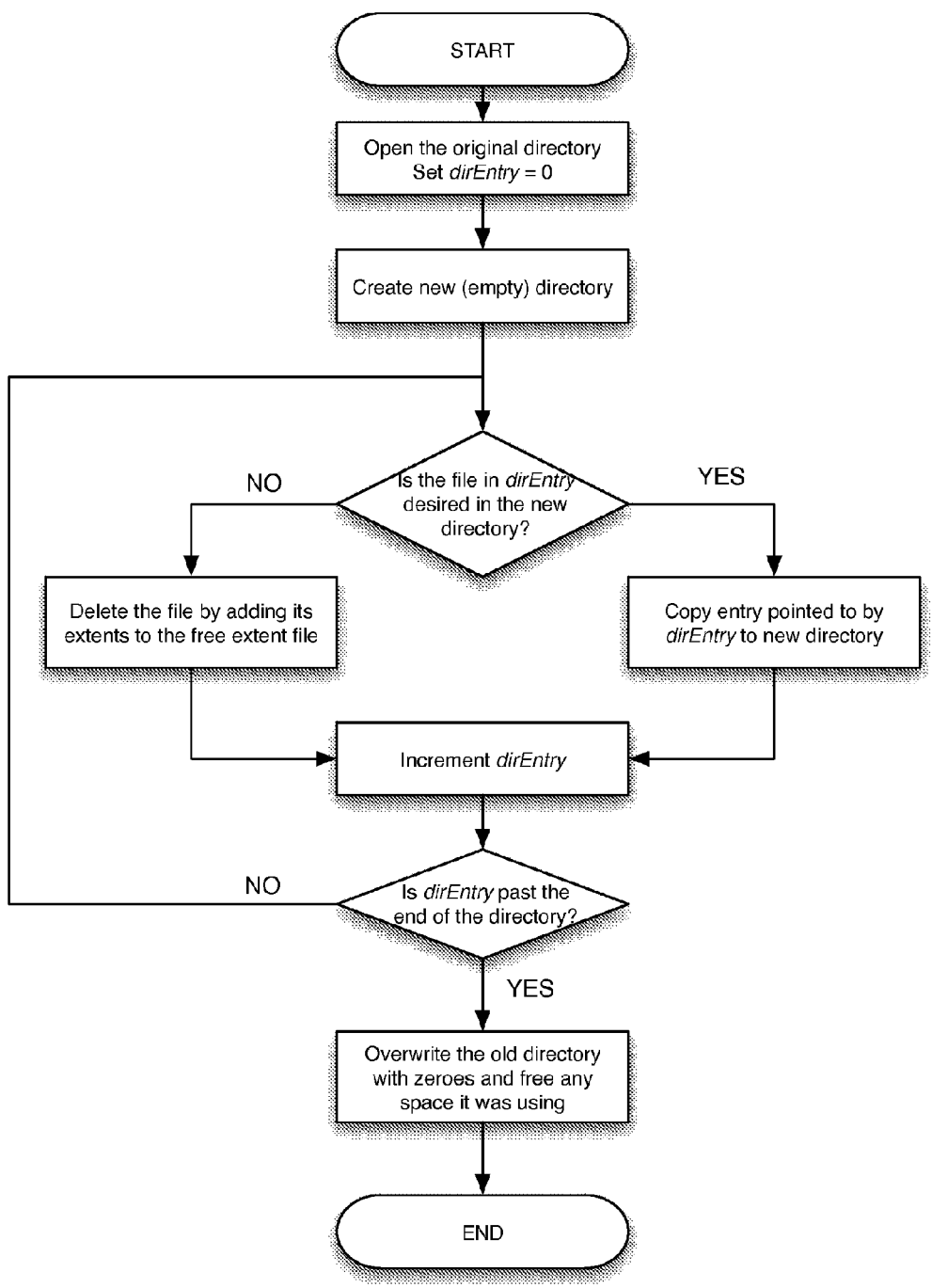
Figure 5: Deleting many files from an UDF directory.

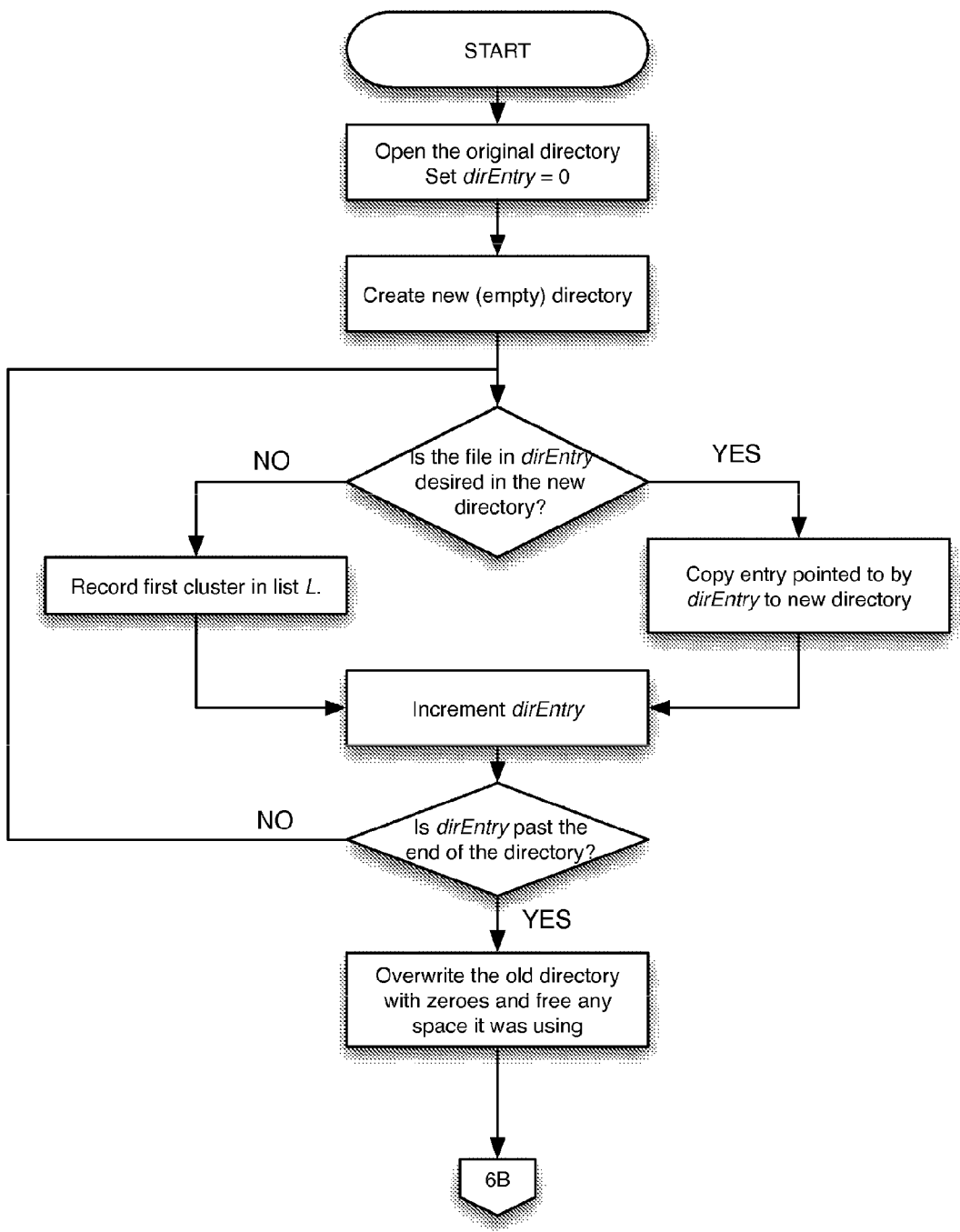
Figure 6A: Deleting many files from an FAT32 directory.

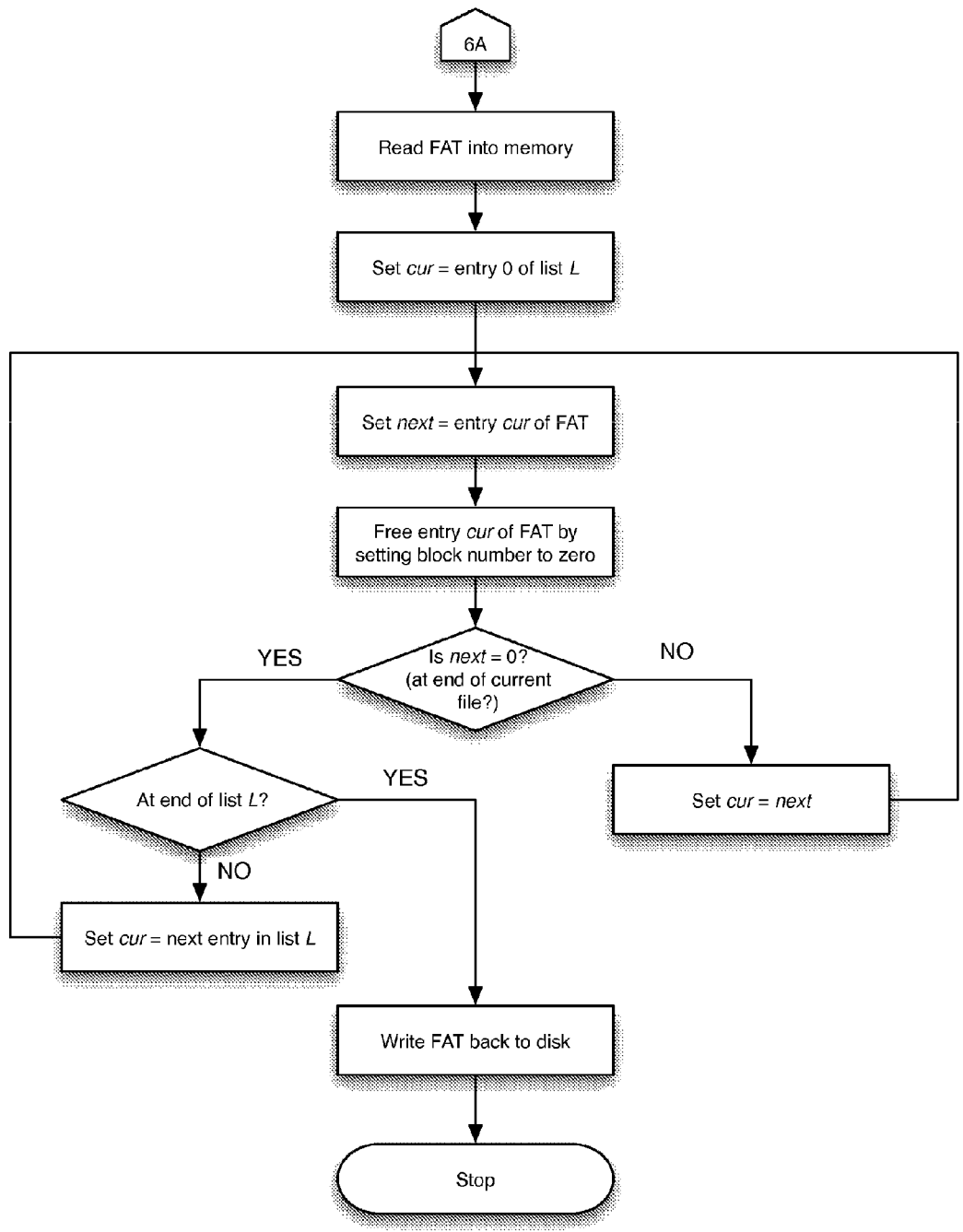
Figure 6B: Freeing blocks in the FAT after batch deletion

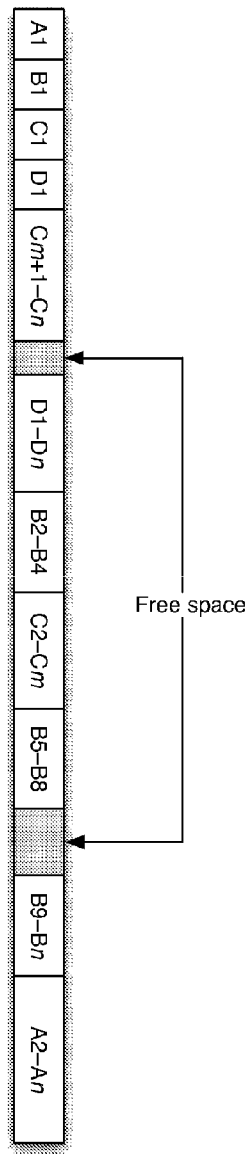

Figure 7: Data layout and free space for files A, B, C, and D. Note that the first blocks of each file are contiguous on the disk, making it faster to erase the first blocks. This approach makes it more difficult to recover usable copies of the files. Files B and C are spread across the media, making it more difficult to locate all of the blocks after deleting the metadata in the inode, directory entry, or FAT.

SELECTIVE FILE ERASURE USING METADATA MODIFICATIONS

CROSS-REFERENCE TO RELATED APPLICATIONS

This is a divisional under 35 U.S.C. §120 of U.S. patent application Ser. No. 11/611,886 filed on Dec. 17, 2006, titled "SELECTIVE FILE ERASURE USING METADATA MODIFICATIONS" (which issued as U.S. Pat. No. 7,571, 176 on Aug. 4, 2009), which claims benefit under 35 U.S.C. §119(e) of U.S. Provisional Patent Application No. 60/753, 635 filed on Dec. 22, 2005, titled "RAPID DISPENSING OF STORED DIGITAL CONTENT", and of U.S. Provisional Patent Application No. 60/747,201 filed on May 14, 2006, titled "APPARATUS AND METHOD FOR SELECTIVELY DISPENSING SOFT ASSETS VIA SUBTRACTIVE INSTALLATION", each one of which is incorporated herein by reference in its entirety.

FIELD OF THE INVENTION

The present invention relates to the field of computer file system technology and, in particular, to a method, system, and program product for quickly and securely erasing files.

BACKGROUND

Computer operating systems (OS) employ file systems to associate the complexity of physical storage hardware to logical abstractions that can be more easily and uniformly manipulated. Modern file systems use a hierarchy of directories (sometimes known as folders and subfolders) and directory entries to keep track of the file names on a file system stored within diverse storage media, including magnetic hard drives, flash memory drives, or optical media such as compact disks or DVDs.

In such file systems, the directory entry for a file typically points to a list of blocks that contain the file's data. The exact format of the directory entry and block list varies with on the specific type of file system (e.g., Linux ext2, FAT32, NTFS, or UDF), but this general approach is widely used because it is simple and can track files and their contents with a minimum of overhead.

Often, it is necessary to delete files from a file system for various reasons, including the need to free up space they are using, the need to replace the file with a more recent version, and the need to remove the file so that its data will no longer be accessible to users of the file system. In order to delete a file, most file systems must accomplish two tasks: marking the file's directory entry as "unused," and making the file blocks that the file was using available to subsequently created files.

If the goal of deleting the file is to ensure that nobody can ever recover the data contained in the file, file systems completely and destructively overwrite the file's data blocks one or more times with known patterns or random data before deletion, ensuring that the contents cannot be read without disassembling the media device.

Overwriting technology is widely known. For example, U.S. Pat. No. 6,731,447 "Secure data file erasure" issued to Keith G. Bunker, et al. on May 4, 2004, and is incorporated herein by reference. Bunker et al. describe a process that ensures the destruction of data files a user wishes to completely erase from a storage medium, such as a hard drive or removable disk. A system administrator can select a quantity of and pattern to be used in overwrites of the data file so that no one can recover the data from the storage medium.

A variant of the data-overwrite approach is the encrypt overwrite approach whereby the data is not permanently lost if one possess the cryptographic key. For example, U.S. Pat. No. 5,265,159 "Secure file erasure" issued to Kenneth C. Kung, on Nov. 23, 1993, and is incorporated herein by reference. Kung describes a method of securely deleting a file on a storage medium of a computer system so that it is not readable, wherein an encryption algorithm is used to encrypt the data in the stored file prior to a conventional deletion process. His invention permits a user to erase files from a permanent storage space in a manner that makes the file totally unreadable by others. When a user requests deletion of a stored file, the file is encrypted so that it is not readable. The user has an option to undelete the file by decrypting the file as long as this operation is done before the storage space is used by another program.

While these data overwriting approaches to file deletion are very secure, they also very slow, being roughly linear in speed to the amount of data erased. Erasing via overwriting all of the files on a 500 gigabyte hard drive in this fashion can require many hours. Encrypting is slower yet as it requires additional compute resources in addition to the data overwriting time.

Instead, nearly all modern file systems take a much simpler, but less secure, approach: they mark directory entries as "unused" and leave most of the other structures on disk untouched. This approach sets a flag in the directory entry, typically changing a single word on disk, and writes the directory entry back to disk. At this point, the file is considered deleted from the point of view of a file system user and the directory entry is available for reuse for future files that might be written, but the entry is largely unchanged otherwise.

After marking the directory entry as "unused," the file system must also make the blocks that the file was using available for use by other files. This can be done in several ways, the most common of which are a bitmap or a free list. In file systems such as Linux ext2, a bitmap records uses a single bit for each block in the file system, with one value (1, for example) indicating that the corresponding block is free, and the other value (0) indicating that the corresponding block is incorporated into a file and thus unavailable for use. In such a system, the file system frees the blocks associated with a file by setting the bits associated with the blocks to 1. This marking is arbitrary but consistent within a file system. Other systems, like NTFS, may use the opposite convention.

No other activity is necessary; thus, file systems concerned with efficiency do not destroy the structures in the blocks themselves that describe the relationship of the blocks to the now-deleted file. This approach makes it straightforward to recover a file that has been deleted if no other files have reused the directory entry or media blocks; however, this is a drawback if the file should not be recoverable. The second kind of file system, such as UDF, maintains a list of blocks that are available (UDF actually uses extents—ranges of blocks—rather than individual block numbers, but the approach is the same). The identifiers for blocks that were used in the now-deleted file are added to the list of blocks available for reuse without necessarily altering the data within the blocks themselves. Not changing block content makes it straightforward to recover the file and its contents using the flagged directory entry and associated (unmodified) block pointers, as long as the data blocks have not been reallocated to another file.

What is needed is a rapid means to erase files singly and in batch while making file recovery very difficult but not necessarily impossible. This protects non-unique digital assets by making data recovery cost more than the replacement value of the digital assets at risk, such as commercial software programs, music tracks, video, and still pictures and the like. By escalating piracy effort from a brief, self-service utility approach to an day-long, expert effort equipped with a $250,000 suite of tools, then a potential pirate more likely would just buy a fresh software package, music track, or movie rather than attempting to restore deleted files.

SUMMARY OF THE INVENTION

In accordance with the present invention, substantially all file information mapping logical to physical storage is deleted. One embodiment is directed to a method for rendering data stored on a storage medium inaccessible. The method includes but is not limited to destroying metadata that identifies a location on the storage medium at which the data is stored such that at least a portion of the data cannot be located on the storage medium by reading of metadata; and leaving a substantial portion of the data intact on the storage medium upon completion of the method. Other embodiments provide fast selective bulk erase and make data harder to recover. These methods work particularly well for creating unique distributions of files derived from a common base.

BRIEF DESCRIPTION OF THE DRAWINGS

FIG. 1A is a schematic of areas within an ext2 file system affected by selective erasure.

FIG. 1B is a flowchart relating to erasing a single file in an ext2 file system.

FIG. 2A is a schematic of areas within a UDF file system affected by selective erasure.

FIG. 2B is a flowchart relating to erasing a single file in a UDF file system.

FIG. 3A is a schematic of areas within a FAT32 file and directory structure affected by selective erasure methods.

FIG. 3B is a flowchart relating to erasing a single file in a FAT32 file system.

FIG. 4 is a flowchart relating to erasing multiple files in an ext2 file system.

FIG. 5 is a flowchart relating to erasing multiple files in an UDF file system directory.

FIG. 6A is a flowchart relating to erasing multiple files in an FAT32 file system directory.

FIG. 6B is a flowchart relating to freeing blocks in an FAT32 file system after batch deletion.

FIG. 7 is a data layout schema for enhancing batch deletion.

DETAILED DESCRIPTION

In accordance with the present invention, we offer a unique approach to deleting files through altering file metadata that is not as secure as totally overwriting the data in the files, but is significantly more secure than loosely flagging directory entries and marking data blocks as unused. This approach is significantly faster than secure deletion via data overwriting, and approaches and in some cases surpasses the speed of traditional file deletion via flagging entries.

As a first approximation, standard erasure time is linearly proportional to the number of files to be erased. Secure, destructive erasure time is linearly proportional to the size of the files to be erased. Using our file metadata erasure approach, erasure time is linear to number of files for small numbers of files. However, when a substantially large number proportion of files within a directory are erased, elapsed time will peak and decline making erasure times shorter and more predictable.

Deleting Single Files

Individual files are deleted by overwriting the entire directory entry with zeroes, rather than just setting a flag or byte in the directory entry. For the ext2 file system, this approach will destroy the file name and index node (inode) number of the file. For more complete security, the inode for the file should also be overwritten with zeros, hiding the file size, and the locations of the first 12 blocks in the file along with the location of extra block lists used to locate file blocks for files larger than 48 kilobytes. In ext2, this approach requires a single additional disk access to overwrite the inode with zeros; the time needed to write the zeros to the copy of the block in memory before writing it back to the media is negligible. Additional security can be obtained by overwriting the first block list of the deleted file (the "single indirect block") with zeros, hiding the identities of the blocks that make up the first 4 megabytes of the file. This changes made to the directory entry, inode, and file blocks are shown in FIG. 1A, with a flowchart in 1B. Note that FIGS. 1A and 1B elide the activities normally associated with deleting a file in ext2, including the manipulation of the free block bitmap; these operations are remain unchanged.

Deleting a single file in a UDF file system can be done similarly. Directories and file entries in a UDF file system are typically stored in a separate "metadata partition," and each file entry contains the locations of the extents (an extent is a set of 1 or more contiguous blocks). As in ext2, a directory entry contains a file name and a pointer to the file's file entry, which is similar to an inode in ext2. Each file entry can be up to one block long, so it is rarely necessary to place extent locations anywhere other than the file entry itself. In a UDF file system, overwriting the entire directory entry with zeros and then marking the directory entry as unused will obscure the existence of the file name and the location of the file entry, and can be done as quickly as a standard fast deletion that only marks the directory entry as unused. If greater security is desired, the file entry can be overwritten with zeros, effectively hiding the location of the contents of the file to which the entry pointed. All of these activities are done in addition to the normal actions taken when deleting a file in a UDF file system, including the addition of the location of the freed blocks to the free block list. The modifications made to the directory entry and file entry are shown in FIG. 2A, with a flowchart in FIG. 2B. As with ext2, FIGS. 2A and 2B elide operations associated with normal deletions.

Deleting a single file in a FAT32 file system is similar to the operation in ext2 and UDF. The directory entry for a file in FAT32 contains the file name (with a possible extension to successive directory entries for long file names) along with attributes including the number of the first cluster (block) of the file's data. The file can be deleted by setting the first letter of the file name to a certain value (0.times.E5); however, this approach makes it trivial to recover the file's name, location, and size. Our approach sets the entire directory entry to zero, and with 0.times.E5 subsequently written to the first byte of the directory entry, marking the entry as available, as shown in FIGS. 3A and 3B. This approach completely hides both the file name, file size, and the location of its first cluster. As with a normal FAT32 file erase, the allocated cluster chain must be traversed and zeroed to free the blocks of the deleted file. This operation also makes it more difficult to recover a file by simply scanning the FAT. It is particularly strong when many files are deleted from a full file system. Metadata processing is here assumed to apply to both long and short name entries and both the primary and secondary FAT tables.

Deleting Large Numbers of Files

Altering directory entries individually works well for deletion of individual files, but can be optimized better for deleting large numbers of files. as might be done for distribution of a relative few files from a well-populated, relatively large storage medium. In such a case, the original directory structure might contain thousands of files, but each individually distributed disk might only retain relatively few files. Rather than produce totally new media for each such distribution, the construction of a new directory containing only the desired files could be used to quickly build a disk that contains just the desired files.

This goal can be accomplished by constructing a list containing the files that will be included in the new directory and scanning the original directory, copying only the desired files to a new directory. The original directory can then be deleted using metadata deletion or destructive deletion thus bulk erasing numerous files at once. The algorithms for the specific file systems listed below assume that the system has already assembled or been given a list of files to keep in the new directory. This list can be kept in any form; however, it is more efficient for the program doing the copying to keep the list in a hash table. It is possible to check whether a particular string (file name) is in the hash table in constant time, allowing the following procedures to run in time linearly proportional to the number of files in the original directory.

For an ext2 file system, a new (empty) directory is created, and the original directory is opened. Next, the process goes through each directory entry in the original directory in turn. If the file referenced by the directory entry is desired to be kept, the directory entry is copied from the old directory to the new directory. If the file referenced by the directory entry is not desired, the file may be optionally deleted as described above. This step might be unnecessary if the file system will not need to accommodate additional files, but is a good idea to keep the location of the deleted files from future users. After all of the entries in the old directory have been scanned, the old directory is deleted either through destructive or metadata erasure. This approach is illustrated in FIG. 4.

The procedure for deleting multiple files is similar for a UDF file system. As above, a new (empty) directory is created, and the original (old) directory is opened. The user then examines each directory entry in turn, copying the entry if it is to be kept and optionally deleting the file if it is not desired in the new directory. After all directory entries have been examined, the old directory is deleted as above. This algorithm is shown in FIG. 5.

Deletion of many files in FAT32 also proceeds by creating a new (empty) directory and opening the original directory. The process then examines each directory entry in turn, copying the entry if it is to be kept and optionally deleting the file if it is not desired in the new directory. Deletion in this case consists of recording the first cluster used in the deleted file in a list. After all entries in the original directory have been examined and optionally copied to the new directory, the process reads in the FAT and deletes all of the files by starting at each deleted file's first cluster and following the pointers through the FAT, marking each visited pointer as free by zeroing it. By grouping all of the modifications to the FAT together, this approach can be much faster than deleting each file separately. This algorithm is shown in FIGS. 6A and 6B.

The above procedures work on a single directory, but many file systems contain large numbers of directories. In order to apply the above procedures to a tree of directories, the procedures should be applied recursively, with a directory being processed after all of its subdirectories have been processed. If this is done, empty directories can themselves be deleted and zeroed, further hiding the location of on-disk information.

If an entire FAT32 file system is processed recursively, as described in the previous paragraph, an additional optimization can be applied. The procedure listed above requires that each file be deleted individually. However, if an entire FAT32 file system is processed and only a few files are to be kept, the entire FAT32 can be rebuilt. In this approach, the list of files to be kept contains all of the files to be retained in the entire file system; thus, the new FAT contains only the information for the files in the list. If there are few files to be kept and many to be deleted, it will be faster to start with a "clean" FAT in which all blocks are marked free, and to then traverse the original FAT for each file to be kept, copying the information for each block in each file to be kept from the original FAT to the new FAT. Any directories to be created can then use blocks still marked "free" in the new FAT. The cross-over point for which approach is faster (delete individual files, or start with a "clean" FAT) varies and can be determined experimentally for a given system. In general, small list of files to be kept will be more quickly done by starting with a "clean" FAT, and that a system in which relatively few files are to be deleted will be handled more quickly using the approach in FIGS. 6A and 6B.

Obfuscating File Structure

In all of these scenarios, after file deletion, the data itself will still exist on the media, but would require considerable effort to recover. Nonetheless, in certain applications, be prudence might dictate taking additional precautions to make recovery of intact but erased files more difficult. Certain practices are particularly useful.

For example, many file systems, particularly those that utilize optical media, store the contents of a file in contiguous blocks on the media. In such a case, recovery simply consists of finding the first block of a file; the remaining blocks follow sequentially. To combat this problem, the blocks of a file should be written non-contiguously. To ensure that performance is still acceptable, however, the file could be stored as non-contiguous extents of reasonable size, say 128 kilobytes to 4 megabytes, making reassembly of the files without usable metadata much more difficult. It is important to note that data in such a file system is still potentially recoverable, but the cost and effort necessary to recover it should exceed the value of the files deleted in such a way.

Another approach to obfuscating file structure is to overwrite selected file blocks to make recovery more difficult. Overwriting just a few blocks in a large file can make the file unusable, especially if the file contains program code. This could be accomplished by overwriting the first block of the file and a small number of subsequent blocks with patterned or random bits. Overwriting the first block obscures the type of the file as well as information about the file's size, entry points, checksum, metadata tags, and other critical information. Overwriting a small number of subsequent blocks can render the entire file useless, particularly if the file contains executable program code. This technique can be used with any of the deletion mechanisms listed above to make file recovery considerably more difficult.

The two approaches above are best combined by storing the first blocks of many files near one another, with the remainder of the files spread across the media. In this way, the first blocks of many files could be overwritten by writing patterns or random bits to large sequential chunks of the media. Since sequential writes are often much faster than writes to non-consecutive locations, this approach has the advantage of being able to obfuscate many files relatively quickly. In addition, the non-sequential storage of individual files would make it more difficult to locate them without the metadata that describes the location of the deleted files' contents. A diagram of this technique is shown in FIG. 7. Optionally after deletion, background storage defragmentation can be scheduled or immediately performed, to improve file access to the remaining unerased files. Furthermore, with Windows implementations, an optional cleanup of the Windows Registry to remove linkages or indicia to any of the erased files or programs is suggested.

While these techniques have been illustrated with several specific, currently widely-used file systems, they are of general application to any file system that manages physical storage. The above description is illustrative only and is not limiting. Instead, the present invention is defined solely by the claims which follow and their full range of equivalents.

What is claimed is:

1. A computer-implemented method of modifying an end-user storage medium that has a plurality of file data stored thereon according to a particular file system, the plurality of file data including a first subset of the plurality of file data and a second subset of the plurality of file data, the method comprising:

rendering the second subset of the plurality of file data accessible, wherein the first subset of the plurality of file data includes a first plurality of individually-identified files, and wherein the rendering further includes:

providing a first set of metadata describing the plurality of file data, wherein the first set of metadata includes a panoplex set of directory information that identifies locations on the end-user storage medium at which the plurality of file data is stored, and wherein the first set of metadata is located in storage other than the end-user storage medium and the first set of metadata is not stored on the end-user storage medium unless and until at least a portion of the panoplex set of directory information is copied to the end-user storage medium;

receiving a first command that distinguishes between the first subset of the plurality of file data and the second subset of the plurality of file data; and based on the first command, creating a second set of metadata in locations on the end-user storage medium, wherein the second set of metadata includes a second subset of the panoplex set of directory information, wherein the creating includes copying directory information corresponding to the second subset of the plurality of file data from the first set of metadata located in storage other than the end-user storage medium into the locations on the end-user storage medium used for the second set of metadata, but not copying directory information corresponding to the first subset of the plurality of file data to the end-user storage medium, such that the second subset of the panoplex set of directory information identifies locations on the end-user storage medium at which the second subset of the plurality of file data is stored, and wherein a substantial portion of the first plurality of individually-identified files remains intact on the end-user storage medium.

2. The method of claim 1, wherein the end-user storage medium includes an initial set of directory information in a location used by the operating system for its directory, and wherein the initial set of directory information is substantially blank such that the initial set of directory information indicates that substantially all storage space on the end-user storage medium is available for storage of file data.

3. The method of claim 1, further comprising erasing at least a first portion of the panoplex set of directory information such that, after the erasing, at least a first portion of the plurality of file data cannot be located by reading the first set of metadata.

4. The method of claim 1, wherein the creating of the second set of metadata includes creating the second set of metadata such that an entirety of the second subset of the plurality of file data can be located on the end-user storage medium by using the second subset of the panoplex set of directory information located on the end-user storage medium.

5. The method of claim 1, wherein the end-user storage medium includes a flash memory.

6. The method of claim 1, wherein the end-user storage medium is a flash card.

7. The method of claim 1, wherein the end-user storage medium is a microSD card.

8. The method of claim 1, wherein the substantial portion of the first plurality of individually-identified files that remains intact on the end-user storage medium is all of the first plurality of individually-identified files.

9. The method of claim 1, wherein the providing of the first set of metadata includes providing the panoplex set of directory information such that the panoplex set of directory information includes file names and pointers corresponding to the plurality of file data, and wherein the creating of the second set of metadata includes creating the second subset of the panoplex set of directory information such that the second subset of the panoplex set of directory information includes file names and pointers corresponding to the second subset of the plurality of file data.

10. A computer system configured to modify an end-user storage medium that has a plurality of file data stored thereon according to a particular file system, the plurality of file data including a first subset of the plurality of file data and a second subset of the plurality of file data, wherein a first subset of the plurality of file data includes a first plurality of individually-identified files, the system comprising:

a processor, a processor storage operatively coupled to the processor, and a storage-medium interface coupled to the processor and configured to be operatively coupled to the end-user storage medium;

a first set of metadata that describes the plurality of file data, wherein the first set of metadata include a panoplex set of directory information that identifies locations on the end-user storage medium at which the plurality of file data is stored, wherein the first set of metadata is stored in the processor storage and wherein the first set of metadata is not stored on the end-user storage medium unless and until at least a portion of the panoplex set of directory information is copied to the end-user storage medium;

a receiver operatively coupled to the processor and configured to receive a first command that distinguishes between the first subset of the plurality of file data and the second subset of the plurality of file data; and a gryph module configured to execute in the processor, wherein the gryph module, when executed by the processor and based on the first command, creates a second set of metadata in locations on the end-user storage medium, wherein the second set of metadata includes a second subset of the panoplex set of directory information, wherein directory information corresponding to the second subset of the plurality of file data is copied from the first set of metadata located in storage other than the end-user storage medium into the locations on the end-user storage medium used for the second set of metadata, but directory information corresponding to the first subset of the plurality of file data is not copied into locations on the end-user storage medium used for directory information, such that the second subset of the panoplex set of directory information identifies locations on the end-user storage medium at which the second subset of the plurality of file data is stored, and wherein a substantial portion of the first plurality of individually-identified files remains intact on the end-user storage medium.

11. The computer system of claim 10, wherein the end-user storage medium includes an initial set of directory information in a location used by the operating system for its directory, and wherein the initial set of directory information is substantially blank such that the initial set of directory information indicates that substantially all storage space on the end-user storage medium is available for storage of file data.

12. The computer system of claim 10, wherein the gryph module, when executed by the processor, erases at least a first portion of the panoplex set of directory information such that, after the erasure, at least a first portion of the plurality of file data cannot be located by reading the first set of metadata.

13. The computer system of claim 10, wherein, after the creation of the second set of metadata, an entirety of the second subset of the plurality of file data can be located on the end-user storage medium by use of the second subset of the panoplex set of directory information located on the end-user storage medium.

14. The computer system of claim 10, wherein the end-user storage medium includes a flash card.

15. The computer system of claim 10, wherein the end-user storage medium includes a microSD-type card.

16. The computer system of claim 10, wherein, after the creation of the second set of metadata, the substantial portion of the first plurality of individually-identified files that remains intact on the end-user storage medium is all of the first plurality of individually-identified files.

17. The computer system of claim 10, wherein the panoplex set of directory information includes file names and pointers corresponding to the plurality of file data, and wherein the second subset of the panoplex set of directory information includes file names and pointers corresponding to the second subset of the plurality of file data.

18. A computer-readable medium useful in association with a computer that includes a processor and a processor storage, the computer-readable medium including computer instructions that are configured to cause the computer to perform a method of modifying an end-user storage medium that has a plurality of file data stored thereon according to a particular file system, the plurality of file data including a first subset of the plurality of file data and a second subset of the plurality of file data, the method comprising:
rendering the second subset of the plurality of file data accessible, wherein the first subset of the plurality of file data includes a first plurality of individually-identified files, and wherein the rendering further includes:
providing a first set of metadata describing the plurality of file data, wherein the first set of metadata includes a panoplex set of directory information that identifies locations on the end-user storage medium at which the plurality of file data is stored, and wherein the first set of metadata is located in storage other than the end-user storage medium and the first set of metadata is not stored on the end-user storage medium unless and until at least a portion of the panoplex set of directory information is copied to the end-user storage medium;
receiving a first command that distinguishes between the first subset of the plurality of file data and the second subset of the plurality of file data; and
based on the first command, creating a second set of metadata in locations on the end-user storage medium, wherein the second set of metadata includes a second subset of the panoplex set of directory information, wherein the creating includes copying directory information corresponding to the second subset of the plurality of file data from the first set of metadata located in storage other than the end-user storage medium into the locations on the end-user storage medium used for the second set of metadata, but not copying directory information corresponding to the first subset of the plurality of file data to the end-user storage medium, such that the second subset of the panoplex set of directory information identifies locations on the end-user storage medium at which the second subset of the plurality of file data is stored, and wherein a substantial portion of the first plurality of individually-identified files remains intact on the end-user storage medium.

19. The computer-readable medium of claim 18, wherein the end-user storage medium includes an initial set of directory information in a location used by the operating system for its directory, and wherein the initial set of directory information is substantially blank such that the initial set of directory information indicates that substantially all storage space on the end-user storage medium is available for storage of file data.

20. The computer-readable medium of claim 18, further comprising instructions such that the method further comprises erasing at least a first portion of the panoplex set of directory information such that, after the erasing, at least a first portion of the plurality of file data cannot be located by reading the first set of metadata.

21. The computer-readable medium of claim 18, further comprising instructions such that the creating of the second set of metadata includes creating the second set of metadata such that an entirety of the second subset of the plurality of file data can be located on the end-user storage medium by using the second subset of the panoplex set of directory information located on the end-user storage medium.

22. The computer-readable medium of claim 18, wherein the end-user storage medium includes a flash memory.

23. The computer-readable medium of claim 18, wherein the end-user storage medium is a flash memory card.

24. The computer-readable medium of claim 18, wherein the substantial portion of the first plurality of individually-identified files that remains intact on the end-user storage medium is all of the first plurality of individually-identified files.

25. The computer-readable medium of claim 18, further comprising instructions such that the providing of the first set of metadata includes providing the panoplex set of directory information such that the panoplex set of directory information includes file names and pointers corresponding to the plurality of file data, and wherein the creating of the second set of metadata includes creating the second subset of the panoplex set of directory information such that the second subset of the panoplex set of directory information includes file names and pointers corresponding to the second subset of the plurality of file data.

* * * * *